(12) United States Patent
Mars et al.

(10) Patent No.: US 12,328,581 B1
(45) Date of Patent: Jun. 10, 2025

(54) WEARABLE DEVICE SYNCHRONIZATION SYSTEM AND METHODS

(71) Applicant: OURARING INC., San Francisco, CA (US)

(72) Inventors: Denis Mars, San Francisco, CA (US); Simon Ratner, San Francisco, CA (US)

(73) Assignee: Ouraring, Inc., San Francisco, CA (US)

( * ) Notice: Subject to any disclaimer, the term of this patent is extended or adjusted under 35 U.S.C. 154(b) by 267 days.

(21) Appl. No.: 17/734,967

(22) Filed: May 2, 2022

Related U.S. Application Data

(60) Provisional application No. 63/183,372, filed on May 3, 2021.

(51) Int. Cl.
| | | |
|---|---|---|
| *H04W 12/33* | (2021.01) | |
| *G06F 1/16* | (2006.01) | |
| *G06F 21/32* | (2013.01) | |
| *G06F 21/62* | (2013.01) | |
| *H04W 4/80* | (2018.01) | |

(52) U.S. Cl.
CPC .......... *H04W 12/33* (2021.01); *G06F 1/163* (2013.01); *G06F 1/1632* (2013.01); *G06F 21/32* (2013.01); *G06F 21/6245* (2013.01); *H04W 4/80* (2018.02)

(58) Field of Classification Search
CPC .......... G06F 21/32; G06F 21/31; G06F 21/30; G06F 21/00; G06F 1/163; G06F 1/1613; G06F 1/16; G06F 1/1632; G06F 21/6245; G06F 21/6218; G06F 21/62; G06F 21/60; G06F 3/01; G06F 3/017; G06F 21/44; H04W 12/33; H04W 4/80; H04W 12/30; H04L 63/08; H04L 63/0861; H04L 9/3231; H04L 63/0428
See application file for complete search history.

(56) References Cited

U.S. PATENT DOCUMENTS

| | | | |
|---|---|---|---|
| 10,871,023 B1* | 12/2020 | Goetz ................. | E05G 1/005 |
| 10,884,455 B2* | 1/2021 | von Badinski ........ | G04G 21/02 |
| 11,600,125 B1* | 3/2023 | Hapgood ............ | H04W 12/041 |
| 2008/0004904 A1* | 1/2008 | Tran ................. | G16H 40/67 |
| | | | 340/286.07 |

(Continued)

FOREIGN PATENT DOCUMENTS

| | | | | |
|---|---|---|---|---|
| WO | WO-2010011465 A2 * | 1/2010 | ........... | G06F 13/387 |
| WO | WO-2017044174 A1 * | 3/2017 | ............. | G06F 21/32 |

*Primary Examiner* — Matthew Smithers
*Assistant Examiner* — Brandon Binczak
(74) *Attorney, Agent, or Firm* — Holland & Hart LLP

(57) ABSTRACT

A method includes placing a smart ring on a wearer, capturing with a biometric portion, wearer biometric data, determining with a processor, whether the wearer is authorized, in response to the biometric data, determining with the first processor, secure biometric data in response to the biometric data, storing in a memory, wearer secure data, thereafter placing the smart ring proximate to a smart dock, determining with the processor, whether the smart dock and the smart ring are associated, transmitting with a transceiver, the secure data and the secure biometric data, in response to determining that the smart dock is associated with the smart ring, and storing in a secure memory element of the smart dock, the portion of the secure data and the secure biometric data under direction of a processor of the smart dock.

14 Claims, 8 Drawing Sheets

(56) References Cited

U.S. PATENT DOCUMENTS

| | | | |
|---|---|---|---|
| 2015/0304851 A1* | 10/2015 | Chen | H04L 63/0853 |
| | | | 713/172 |
| 2016/0227390 A1* | 8/2016 | Prencipe | H04W 4/80 |
| 2017/0185764 A1* | 6/2017 | Chen | G06F 21/6218 |
| 2021/0004454 A1* | 1/2021 | Chester | H04L 63/0807 |

* cited by examiner

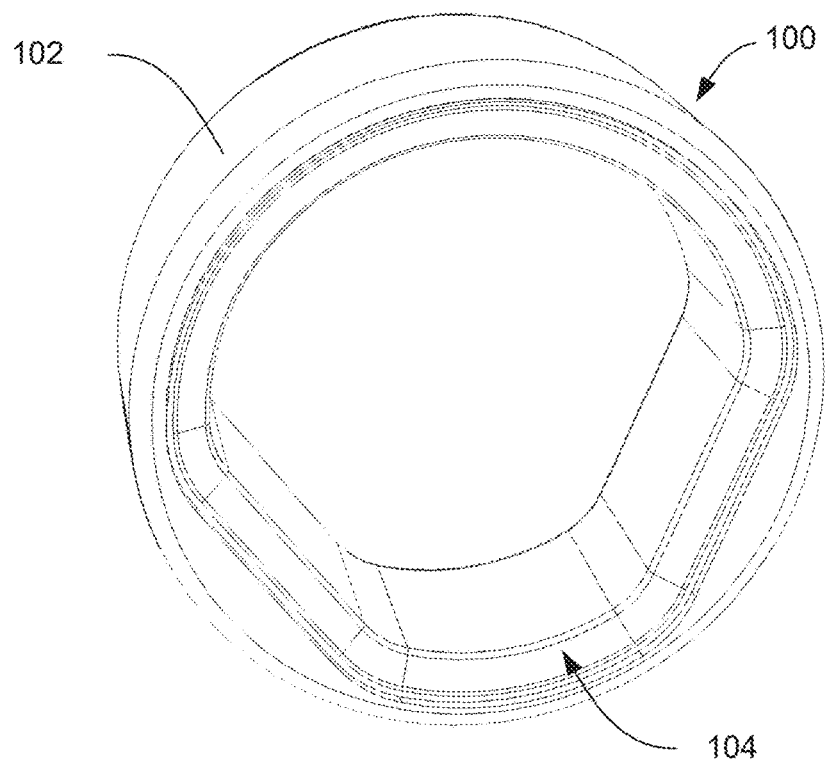
FIG. 1A
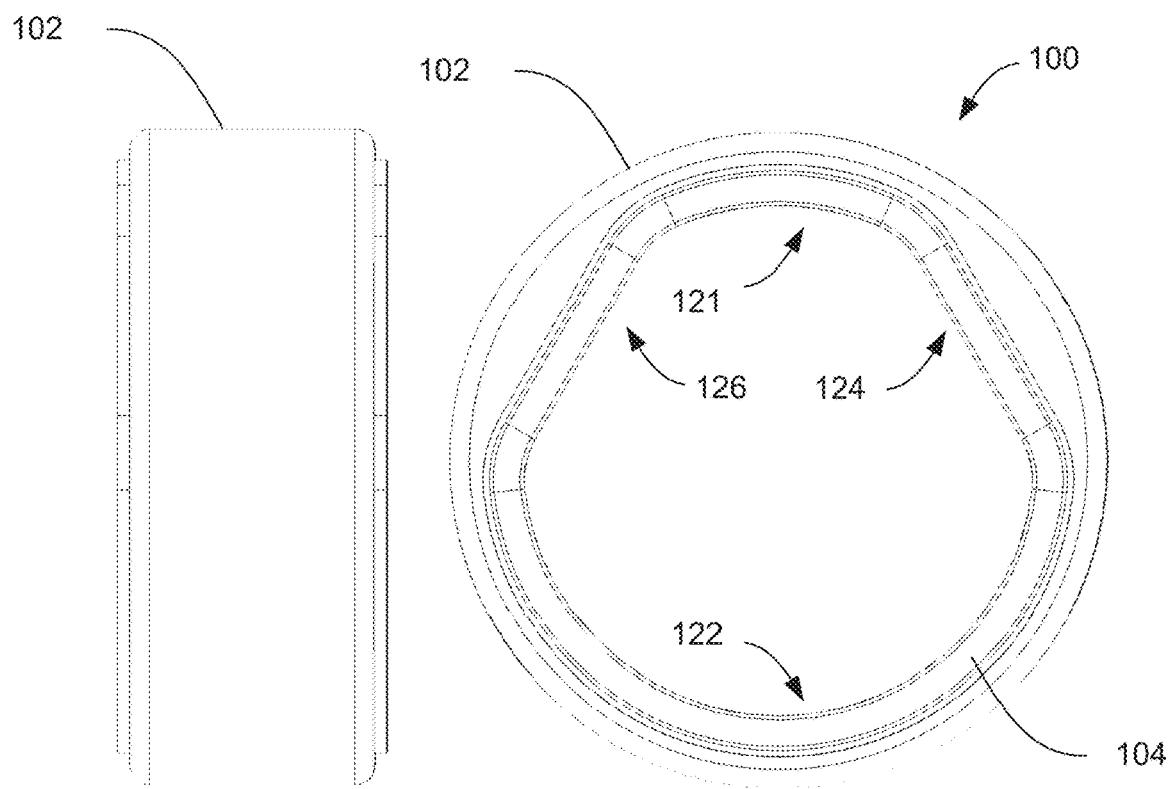
FIG. 1B
FIG. 1C

WEARABLE DEVICE SYNCHRONIZATION SYSTEM AND METHODS

CROSS-REFERENCE TO RELATED APPLICATIONS

The present application is a non-provisional of, and claims priority to U.S. App. No. 63/183,372 filed May 3, 2021. That application is incorporated by reference herein, for all purposes.

BACKGROUND

The present invention relates to smart wearable devices. Additionally, the present invention relates to smart wearable devices and methods for synchronizing data on smart wearable devices.

The inventors of the present invention have contemplated developing a new class of smart wearable devices with secure storage that can store sensitive data, such as Bitcoin data, private keys, or the like. One drawback to this concept is that such devices are small, they are easily lost or stolen. Because of this, it is contemplated that such sensitive data may become easily lost to the user (e.g. Bitcoin data) or used by unauthorized parties (e.g. private keys). Accordingly, more secure smart wearable devices are desired.

Another problem contemplated by the inventors is how to securely provision or synchronize smart wearable devices with sensitive data, especially if the smart wearable device is designed to be a "cold wallet", i.e. off-line storage device. One possible solution is to store a back-up copy of the sensitive data on a laptop computer, the cloud, or the like, and to transfer the sensitive data to the wearable device on demand. For example, if a user loses their smart ring, the user may wish to provision a replacement smart ring with a back-up copy of the secure data. Drawbacks to this approach include that the laptop, the user's account on the cloud, or the like that stores the secure data could easily be hacked with spyware or other tools, and the data may be easily stolen. With such a solution, even if the smart ring maintains the secure "cold" data, the back-up copy of the secure data is vulnerable.

In light of the above, what is desired are smart wearable devices and methods for addressing the problems described above with reduced number of drawbacks.

SUMMARY

Embodiments of the present invention relate to smart wearable devices such as smart rings, smart bracelets, smart ear buds, smart jewelry, and the like.

In various embodiments, a smart wearable device is described that includes a wearer biometric, gesture, or other capture mechanisms. Typically these capture mechanisms are used to capture data of the wearer when the smart wearable is worn—a fingerprint or vessel patterns when a smart ring is put on, a retina pattern when smart glasses are put on, otoacoustic emissions when smart earbuds are put on, and the like. The captured data may then be processed and compared to authorized user data (data associated with the owner of the device, hash of such data, etc.) that is stored in a secure element of the smart device. In some embodiments, when the wearer data matches the authorized user data, the wearer is authenticated, the smart device may be unlocked, and the secure data stored in the secure element may then be accessed. If not authorized, the smart device may remain locked.

In some embodiments, a smart base or dock is provided that interfaces with the smart wearable device. The smart base may be a dedicated storage device or may have a storage device and have other functionality, e.g. charger for the smart wearable device. In various embodiments, the smart base may also be a secure element that stores the secure data, e.g. the secure data stored on the smart device, the authorized user data (e.g. biometric data, hash of biometric data, or the like), etc. In operation, when a smart wearable device is unlocked and coupled to the smart base, the data stored on the secure elements may be synchronized, the data on the smart wearable device may be backed up on the smart base, or the like. If the smart wearable device is not unlocked, the data stored on the smart base or the smart wearable device may remain inaccessible.

In some cases, a new smart wearable device is presented to a smart base that already stores secure data. Such a case may be where a user loses their smart wearable device, and buys a new, replacement smart device (e.g. ring), or the like. In operation, a user may enter their biometric data, or the like using the new smart device and then couple it to the smart base. In response, the smart base may process the captured biometric data and compare it to biometric data resident within its own secure element. If there is a match, the user is authenticated, and data from the secure element of the smart base may be transferred to the secure element of the new smart device. If there is no match, the smart base maintains the secure data and does not provision the new smart device. In various embodiments, even if a user loses their first smart device, their secure data, e.g. bitcoin addresses, etc. can be securely recovered from the smart base and loaded onto a second smart device. Because the lost or stolen first smart device is secured via the user biometric data, or the like, the secure data on the first smart device remains inaccessible to other unauthorized users.

According to one aspect, a system is described. One apparatus includes a first smart ring having a biometric sensing device configured to capture first biometric data associated with a wearer of the first smart ring, a first processor coupled to the biometric sensing device, wherein the first processor is configured to determine whether the first biometric data is authorized, and wherein the first processor is configured to determine first secure biometric data in response to the first biometric data, and a first secure memory element coupled to the first processor, wherein the secure memory element is configured to store first secure data associated with the wearer of the first smart device, wherein the first secure memory element is configured to output the first secure data and the first secure biometric data under direction of the first processor. A smart ring may include a first short-range transceiver coupled to the first secure memory element, wherein the first short-range transceiver is configured output at least a portion of the first secure data and the first secure biometric data from the first smart ring, a first power source configured to provide operating power to the first smart ring, and a first power input portion coupled to the first power source, wherein the first power input portion is configured to receive power signals from a source external to the first smart ring, and wherein the first power input portion is configured to recharge the first power source in response to the power signals. A system may include a smart dock, wherein the first smart ring is removably disposable proximate to the smart dock including a power output portion configured to provide the power signals to the first power input portion of the first smart ring and a second short-range transceiver configured to receive the portion of the first secure data output and the first secure biometric data from the first short-range transceiver. A smart dock may include a second secure memory element coupled to the second short-range transceiver, wherein the second secure memory element is configured to store the portion of the first secure data and the first secure biometric data, and a second processor coupled to the second short-range transceiver and to the second secure memory element, wherein the second processor is configured to direct the second secure memory element to store the portion of the first secure data and the first secure biometric data.

According to another aspect, a method is disclosed. A process includes placing a first smart ring on a finger of a wearer, capturing with a first biometric sensing portion of the first smart ring, first biometric data associated with the wearer, determining with a first processor of the first smart ring, whether the wearer is authorized, in response to the first biometric data, and determining with the first processor, first secure biometric data in response to the first biometric data. A method may include storing in a first secure memory element of the first smart ring, first secure data associated with the wearer; thereafter placing the first smart ring proximate to a smart dock, and determining with the first processor, whether the smart dock is associated with the first smart ring. A technique may include transmitting with a first short-range transceiver of the first smart ring, at least a portion of the first secure data and the first secure biometric data in response to determining that the smart dock is associated with the first smart ring, receiving with a second short-range transceiver of the smart dock, the portion of the first secure data output and the first secure biometric data from the first short-range transceiver, and storing in a second secure memory element of the smart dock, the portion of the first secure data and the first secure biometric data under direction of a second processor of the smart dock.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIGS. 1A-1H illustrate various views of some embodiments of the present invention;

DETAILED DESCRIPTION

Figure 1D:
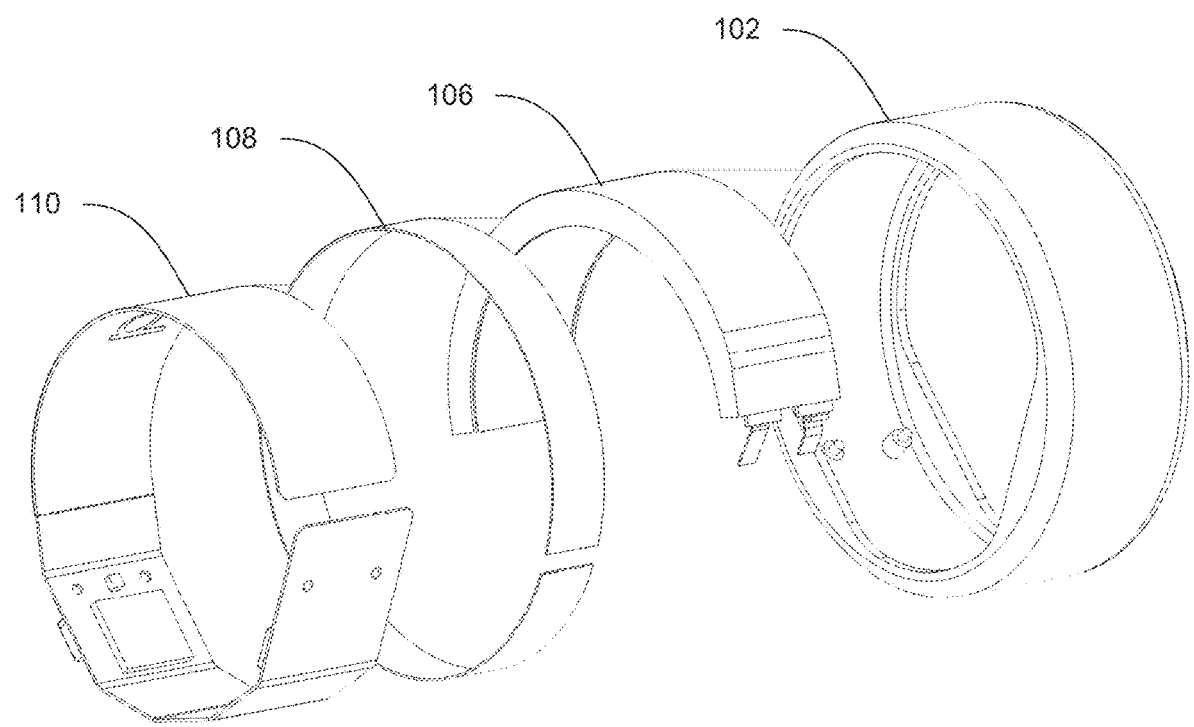

In various embodiments, a smart wearable device may be embodied as a smart ring, smart tag, smart glasses, smart headphones, and the like. In the example below, a novel smart ring is disclosed. In various embodiments, a smart ring may include a power supply such as a lithium ion battery, lithium polymer battery, an ultracapacitor, carbon nanotube capacitor, button batteries or the like. In various embodiments, the power supply is curved in shape, as illustrated below. In the case of discrete batteries, e.g. button batteries, these batteries should also be coupled in a curved orientation, to match the curvature of the ring form factor.

In various embodiments, power management and charging circuitry is typically provided to control charging of the power supply. In some examples, charging may be facilitated by and external power source, such as an electrical source, magnetic source, radio frequency (rf) source, NFC (e.g. Qi Charger), light or laser source, heat source, or the like. In various cases, the charging circuitry may include components appropriate for the charging source, such as electrical contacts, metal coils, solar or light power conversion regions, thermoelectric generation components, or the like.

Additionally, in some embodiments of a wearable device, self-power-generation components may be included that generate power in response to movement of the wearable device, e.g. smart ring, bio patch, wrist device, etc. Some examples may include a movable magnet or magnetic liquid moving that passes back and forth through a coil as the person walks to generate electricity. Other examples may include a charged liquid passed back and forth through a ferromagnetic material that generates the electricity. In some cases, a channel or tube for the liquid may span only a sector of the ring, and in other cases, the channel or tube may run fully around the ring. In some embodiments, the tube may be tapered in the vicinity of the energy producing coil or ferromagnetic material. Accordingly, as the user moves, the liquid may move in the tube at a first velocity, and as the liquid reaches the tapered section, the liquid velocity may increase to a higher, second velocity. In this example, the higher velocity liquid may induce greater electricity generation. In various embodiments, usable ranges of viscosity of the liquid may be determined based upon power requirements and predicted user motion.

In the embodiments below, other functional elements may include a microcontroller unit having a wireless transmitter. In various embodiments, the microcontroller unit may perform identification functionality, e.g. providing a non-permanent, ephemeral IDs output, communicating with authentication services, interfacing with other smart devices, interfacing with identity reader devices, facilitating other types of authentications, such as FIDO 2, or the like. Examples of wireless transmissions that may be supported includes Bluetooth, ultrawide band (UWB), Zigbee, rf, WIFI, cellular, 4G, 5G, and the like.

In some embodiments, memory elements may be provided for storage of data, computer code executable upon the microcontroller; a secure element for storage of secure data, such as encryption keys, tokens associated with financial accounts (e.g. credit cards, debit cards, etc.), tokens provided by embodiments of the present invention, described above, and the like. In some cases, NFC communication is provided enabling financial transactions using data stored within the secure element and point of sale (POS) terminals, and the like.

In various embodiments, a number of sensors may be provided to sense a variety of parameters associated with the user. In some embodiments, a temperature sensor is provided to sense the temperature of the user adjacent to the wearable device. In some examples, a temperature sensor may utilize: a thermocouple, a thermistor, a resistor temperature detector, a semiconductor sensor, an infrared sensor, or the like. Depending upon the embodiment, one or more temperature conductive contacts, e.g. metal, may be used; an infrared transparent (or substantially transparent) covering may be disposed above an infrared sensor; and the like.

In other embodiments, a heartbeat, a blood oxygen sensor, or the like may be provided, typically based upon reflection or transmission of LED light relative to the user (e.g. finger, earlobe, ear canal, temple, etc.), to monitor the heartbeat, heartbeat pattern, or the like of the user. Other types of biometric sensors may also be provided, such as a blood-vessel sensor, a fingerprint sensor, and the like. In one embodiment, a specific region of the smart ring may be electrically insulated from other portions of the smart ring that contact the user's fingers. In such embodiments a user may place a finger from their other hand upon the specific region to enable the ring to sense a user's EKG, ECG, or the like. In various embodiments, these types of biometric sensors may be used for authenticating the user on the device. For example, using a capacitive, optical sensor, or the like on the interior of the ring, the smart device (e.g. smart ring, smart earbud, smart glasses) may be locked every time the device is taken off, and not unlocked until the proper biometric credentials are presented. In other embodiments, various biometric data may be used for health monitoring purposes, as disclosed herein.

In some embodiments, additional sensors may include accelerometers, gyroscopes, magnetometers, pressure sensors, or the like, that capture movements of the smart device. In various embodiments, the captured perturbation data may be used for a number of functions. One function is the capturing of user movements and recognition of these movements as one or more pre-defined gestures. Upon determination of the gestures, the smart ring may perform specific functions, direct an external device to perform a function, or the like. In other embodiments, the captured perturbation data may be used to determine biometric characteristics of the user, e.g. gait, stride length, and the like.

In some embodiments, sensors described above, as well as additional sensors may be used for the user to select different modes of operation and to interact with the smart devices. As merely an example, a pressure sensor may detect a user pressing upon the smart device; a capacitive sensor may detect whether the user is wearing the smart device; a microphone may detect spoken user commands; one or more physical buttons may detect a user depressing a button; and the like. In other examples, a magnetic sensor may determine orientation of the ring with respect to a global magnetic field, the presence and orientation of a local magnetic field (device) with respect to the ring, or the like. In some embodiments, any number of outputs may be provided to give the user feedback. Examples of user outputs includes, a micro display (e.g. OLED), one or more status LEDs, vibrational (haptic) feedback, audio outputs, SMS output and the like. In some embodiments, a smart ring is disclosed, as illustrated below.

FIGS. 1A-1G illustrate various views of some embodiments of the present invention. More specifically, FIG. 1A illustrates a perspective view, FIG. 1B illustrates a typical side view, and FIG. 1C illustrates a top/bottom view. In these figures, a smart ring 100 includes an exterior shell portion 102 and an interior portion 104, as will be discussed below. As can be seen, the shape of exterior shell portion 102 may circular, semi-circular, or the like, and the interior shape of interior portion 104 may have curved portions 121 and 122 and less curved portions 124 and 126 (e.g. flat, larger radius of curvature than portions 121 or 122, etc.). In some embodiments, less curved portions 124 and 126 may include substantially flat regions. In other embodiments, less than two, or more than two curved portions (e.g. 124 and 126) may be used in the design, for example, the interior profile of the ring may include one less curved portion, three less curved portions, four less curved portions, or the like.

In various embodiments, as can be imagined by one of ordinary skill in the art, the less curved portions 124 and 126 disclosed here push into the skin of a wearer and provides more substantial contact regions between smart ring 100 and a user's finger. As illustrated below, in some embodiments, a fingerprint sensor, a capillary sensor, or other biometric acquisition device may be associated with one of such flat (or less curved) regions. It is believed that a sensor, disposed in such a flat region, will then be able to obtain a higher quality biometric sample. Additionally, in some embodiments, a temperature sensor, e.g. an infrared sensor, a thermal conductive sensor, or the like may be associated with the other of such flat regions. Again, it is believed that a higher finger to sensor contact may be able to obtain higher quality temperature readings. Still further, in some embodiments, by locating a flat NFC antenna within the less curved, e.g. flat, regions will allow higher quality NFC communications between the smart ring and an external NFC device.

In various embodiments, exterior shell portion 102 may be made of any suitable material, such as: plastic, ceramic, metal, silicone, titanium, wood, or the like. Additionally, interior portion 104 may be made of any suitable material such as: plastic, ceramic, metal, silicone, titanium, wood, epoxy, latex, or the like. As will be described below, portions 102 and 104 may be opaque, transparent, or translucent.

FIG. 1D illustrates an embodiment of an exploded view of a smart ring including exterior shell portion 102, a power source 106, a light pipe 108 and an electronics assembly 110. These elements will be separately discussed below.

In some embodiments, a light pipe 108 may extend substantially around the circumference (e.g. 330 degrees to 360 degrees), or may extend around a portion of the circumference (e.g. <360 degrees, 180 degrees to 270 degrees, 90 degrees to 180 degrees, or the like). In some cases, light pipe may be disposed substantially adjacent to an interior surface of exterior shell portion 102 (on the larger radius of curvature surface of power source 106). In these embodiments, light output by light pipe 108 may be configured to be output through exterior shell portion 102 or the circular edge (e.g. same edge as sidewalls 114 in FIG. 1F) of exterior shell portion 102. In other cases, light pipe may be disposed closer to interior portion 104 (e.g. on the smaller radius of curvature surface of power source 106. In these embodiments, light output by light pipe 108 may be configured to be output through interior portion 104 or the circular edge (e.g. same edge as sidewalls 114) of exterior shell portion 102.

In various embodiments, light pipe 108 (sometimes known as a light guide) may be optically coupled to one or more light sources (e.g. LEDs) provided on electronics sub-assembly 110. In some cases, the light sources may be visible light sources (e.g. red, blue, green, etc.) and in other embodiments, the light sources may be UV, IR, or the like. In some embodiments, light pipe may include photoluminescent quantum dots, fluorescent materials, or the like, that may convert incoming radiation to radiation within a visible spectrum.

Figure 1E:
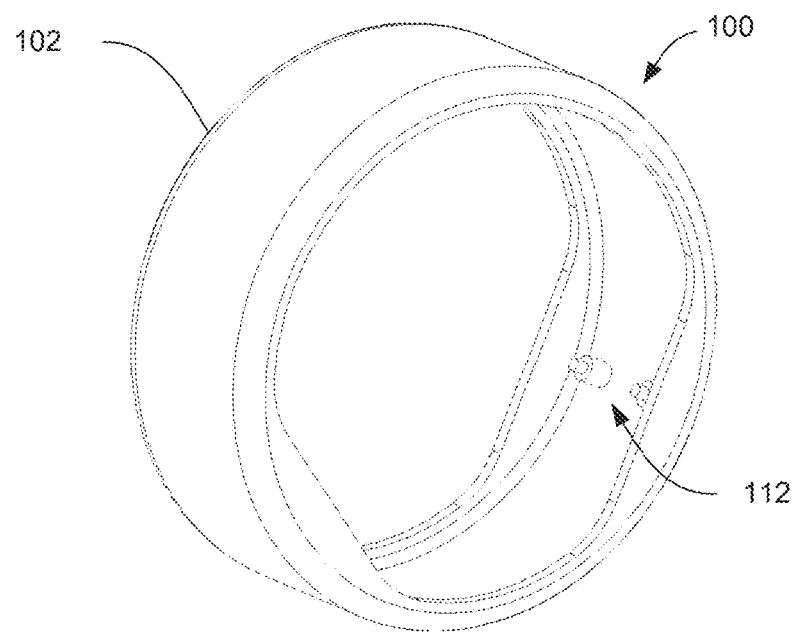

FIG. 1E illustrates an embodiment of an exterior shell portion. In some embodiments below, exterior shell portion 102 may be manufactured from a material such as: injection molded plastic, a metal, silicone, or the like. They may also be machined from blocks of material, such as ceramic material, and the like. In some cases, the material may be translucent, clear, opaque. In other cases, portions of exterior shell portion 102 may be formed from more than one material, having different textures, light transmission capability, or the like.

As illustrated in FIG. 1E, in some cases, alignment pins 112 may be provided and may be monolithically formed with exterior shell portion 102. In other cases, alignment pins 111 may be attached, glued, or the like to exterior shell portion 102. In other embodiments, other types of alignment structures may be used, such as alignment tabs, holes, or the like. In still other embodiments, alignment structures may not be needed. As will be illustrated below, alignment pins may be be attached to the interior of exterior shell portion 102 via one or more subframes.

Figure 1F:
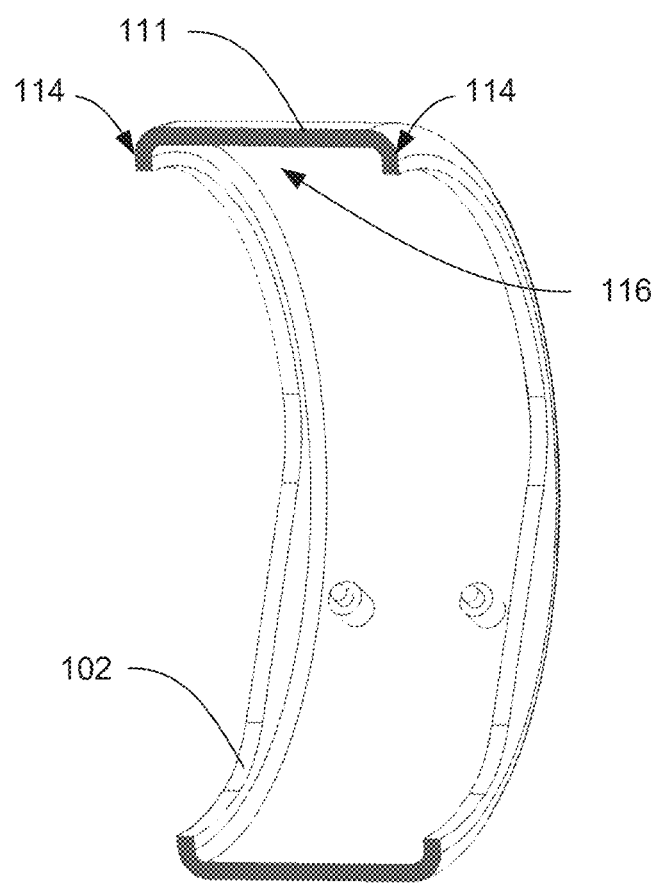

FIG. 1F illustrates a cross-section of an exterior shell portion of some embodiments. In the embodiment of the cross-section below, exterior shell portion 102 includes a rounded exterior surface 111, and side walls 114 that may be formed of the same material. In other embodiments, these portions may be separate. In this example, round exterior surface 111 and sidewalls 114 form an interior region 116, into which components 106-110, and the like may be placed. In some embodiments, the interior of exterior shell portion 102 need not be smoothly curved of uniform thickness, but portions may have varying thickness or geometry, portions may be scribed, etched, or formed with geometric features (e.g. company logo, a symbol (e.g. a check mark)), or the like. In cases where there is a light source (e.g. light pipe 108) disposed within interior region 116, light provided by light pipe 108 may be non-uniformly output through exterior shell portion 102 on account of the differences in material thicknesses, geometry, or the like. As an example, a company logo, a symbol (e.g. a check mark, an X mark), or the like may not be visible, until such structures are back-lit by light pipe 108, or any other light source (e.g. LED) disposed within interior region 116.

Figure 1G:
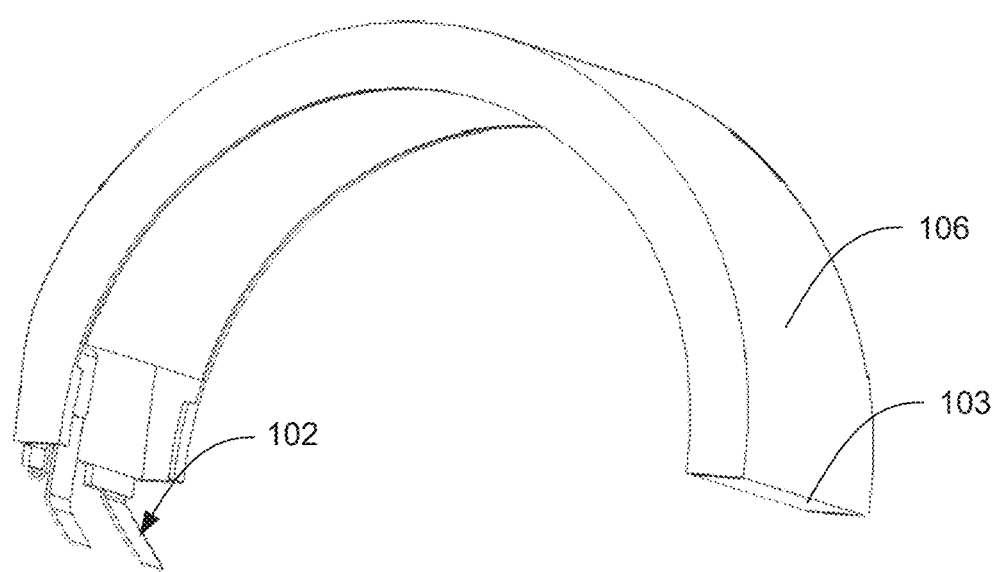

FIG. 1G illustrates an embodiment of a power source 106. In various examples below, power source 106 may be formed in a curved shape, substantially matching the curve of a portion of interior region 116. In the following example, power source 106 may be approximately in an annulus shape, having a sector angle from 90 to 180 degrees, 45 to 270 degrees, or the like. In various embodiments, power source may be a lithium ion battery, a lithium polymer battery, a carbon-nanotube storage device, an ultracapacitor, or any other type of conventional battery (e.g. a series of button batteries). As shown in this example, power source 106 may include power connections 118, formed or a metal such as nickel, copper, silver, or the like.

Figure 1H:
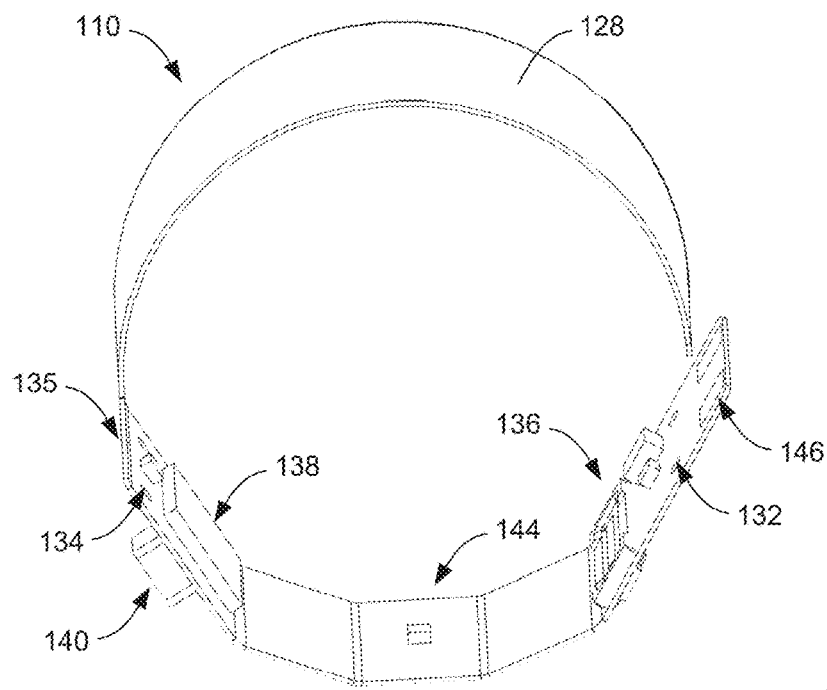

FIG. 1H illustrates an embodiment of an electronic subassembly. In this example, electronics subassembly 110 includes an adhesive portion 128, a printed circuit board (PCB) 130, and a number of electronic components. In this embodiment, adhesive portion 128 is used to couple electronics subassembly to the interior of exterior shell portion 102. In various embodiments, printed circuit board 130 may be a flexible PCB (e.g. Mylar based), may include rigid PCBs coupled via flexible PCBs, or the like. As can be seen, PCB may include round holes 132, 134, or other geometric shaped holes, or may include slots, indents, or the like. These geometric features 132, 134, or the like may be used to physically secure PCB 130 within exterior shell portion 102. More specifically, alignment pins 112 (or other types of alignment geometry) may be disposed through holes 132, 134 (or other types of alignment geometry) to reduce the rotation of electronics subassembly 110 within exterior shell portion 102 during an assembly or manufacturing process.

In various embodiments, electronics subassembly 110 may include a number of electronic components, such as a temperature sensor 136, a presence sensor 144, a biometric data reader 138, and an NFC power/communications device 140. Other types of electronics, not specifically called-out may include, a processor, a short-range wireless transceiver, an accelerometer, a gyroscope, a magnetometer, a heartbeat sensor, audio output devices, audio input devices, LEDs and the like.

In various embodiments, temperature sensor 136 may be based upon optical IR, thermocouple, thermistor or other temperature sensor. Additionally, presence sensor 144 is configured to determine whether a person is wearing smart ring 100. In various embodiments, presence sensor 144 may be a capacitive sensor, a heat sensor, a pressure sensor, optical sensor, or the like. In various embodiments, biometric data reader 138 may be a fingerprint sensor, a blood-vessel imaging device, a heartbeat sensor, or the like. These devices may be imaging devices, ultrasonic devices, or the like. It is contemplated that biometric data reader 138 is used to acquire biometric data unique to the user.

In various embodiments NFC device 140 may include an NFC interface along with associated processing capability. In some embodiments, NFC device 140 may be used for a number of functions including: receiving data from an external NFC device, sending data to an external NFC device, receiving power from an external NFC device, or the like. As examples, NFC device 140 may be used to receive data or queries from another NFC device, and to query or send data (e.g. an identifier, temperature status data, etc.) to another NFC device. Additionally, in some embodiments, NFC device 140 may support charging of smart ring 100 via an NFC wireless charging infrastructure, such as Qi charging, wireless charging (WLC) specification, or the like.

In some embodiments, power connections 118 of power source 106 are coupled to tabs 146, as illustrated below. In some embodiments, tables 146 and power connections 118 may be spot welded together, avoiding a separate soldering process. In other embodiments, tabs 146 may be disposed near holes 134, and power source 106 may run the same direction as adhesive portion 128.

In some embodiments, when assembled together, power source 106 and electronics subassembly 110 may be configured in a "C" shaped structure. In various embodiments, after assembly, the gap 147 in the C shaped structure, for example between portion 103, FIG. 1G and portion 135, FIG. 1H, is physically lessened, closed or overlapping (sometimes forming an O-shaped structure) by pressing down upon power source 106 and up upon electronics subassembly 110. The combined structure is then inserted into exterior shell portion 102, i.e. over sidewalls 114, aligned to alignment structures 113, and then allowed to expand back into the C shaped structure. More specifically, alignment structures 112 align to alignment portions 132 and 134, and then adhesive portion 128 adheres to the inner wall of the exterior shell portion 102 in this step. The partially formed smart ring is thus formed.

In various embodiments, the partially formed smart ring is disposed within a mold and then an encapsulant material is over-molded upon the partially formed smart ring. In some embodiments, the material may filling interior region 116, optionally including both sides of electronics subassembly, power source 106, and the like. In some cases, one or more sets of electrodes, windows, or the like may not be encapsulated by the material, and may remain exposed to the interior of smart ring 110. In some examples, the windows may be used for fingerprint sensors, heartbeat sensors, blood vessel (e.g. capillary) sensors, or the like, and electrodes used for charging, for determining temperature, for determining electrical characteristics of the user, or the like.

In various embodiments, the encapsulant material may be silicone, epoxy, latex, plastic, or the like. The encapsulant material may be opaque, transparent, translucent or the like.

Figure 2:
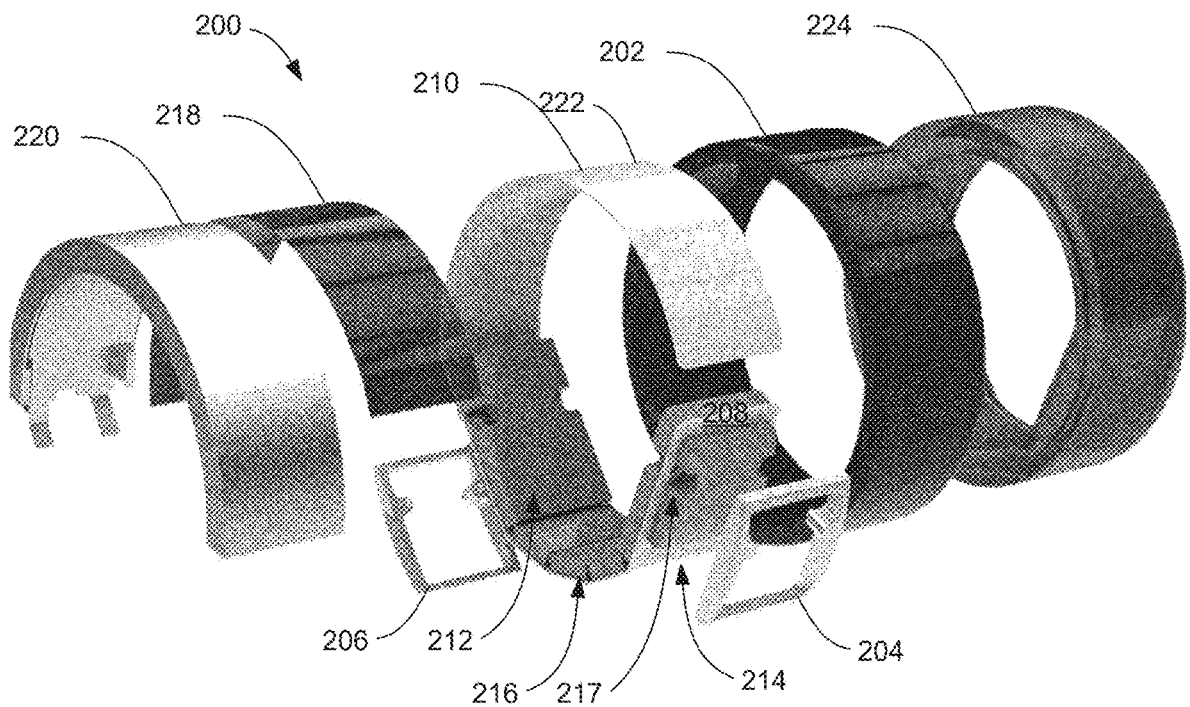
FIG. 2 illustrates additional embodiments of the present invention.

FIG. 2 illustrates additional embodiments of the present invention. This embodiment of a smart ring 200 may include: an exterior shell portion 202 formed similar to exterior shell portion 102, i.e. having side-walls. In this embodiment, alignment frames 204 and 206 are illustrated. Alignment frames 204 and 206 may be adhered to an inner wall of exterior shell portion 202 using any conventional adhesive, before the electronics components are placed within exterior shell portion 202. Frames 204 and 206 may have similar alignment or registration functionality to the alignment structures 112 illustrated in the above figures.

In some embodiments, alignment frames 204 and 206 may be made of a metal that is attracted to magnets, e.g. includes Nickle, Iron, Cobalt metal, typically in an alloy form. A charger system for smart ring 200 may include one or more magnets that are attracted to frames 204 and/or 206 allowing for a secure contact for charging or data transfer. For example, charging pins on smart ring 200 may then be aligned to charging pins on a dock, an NFC antenna or wireless charging coil in smart ring 200 may then be aligned to an NFC antenna or charging coil on a dock, and the like.

Also shown in this example is an electronics subassembly 210 including a number of electronic components coupled to a flexible printed circuit board 208 (e.g. Mylar or other polyester film). Similar to the above, electronic components may include a temperature sensor 214, a presence sensor 216, an NFC interface 212, and the like. In other embodiments, other components may include a processor, a wireless transceiver (e.g. Bluetooth, ultrawide band (UWB), ZigBee, WIFI), an accelerometer, a gyroscope, a magnetometer, an altimeter, LED devices, and the like.

In this embodiment, during an assembly process, notches, e.g. 217, in electronics subassembly 210 are used to receive notches in alignment subframes 204 and 206 thereby inhibiting electronics subassembly 210 from rotating within exterior shell portion 202.

In some embodiments, a material 218 may be provided between electronics subassembly 210 and power source 220. Accordingly, the ordering of materials may be, power source 220, material 218, adhesive portion of electronics subassembly 210, exterior shell portion 202. In some embodiments, material 218 may be formed of a ferrite material to form a ferrite reflector structure, and an additional NFC antenna 222 for the NFC device may be disposed on flex PCB 208 in the adhesive region. In such embodiments, the ferrite reflector helps to extend the range of NFC antenna 222, and helps isolate NFC antenna 222 from power source 220.

In the illustrated embodiment, material 224 represents the over-molded material that encapsulates electronics sub-assembly, power supply 220, and the like within exterior shell portion 202, and form an interior region of smart ring 200. Similar to the above, material 222 used may include silicone, epoxy, plastic, or the like, and may be somewhat transparent, translucent, opaque, or the like.

In various embodiments, a smart wearable device may be embodied as a smart ring, smart tag, smart glasses, smart headphones, smart fitness trackers, smart watches and the like. These devices may be electrically charged through a standardized port (USB-C, USB, or the like), may be wirelessly charged by NFC signals, rf or magnetic signals, may be wirelessly charged by solar or laser light, and the like. Additionally, in some embodiments, self-charging capability, e.g. heat differential, and the like, may also be included.

Figure 3A:
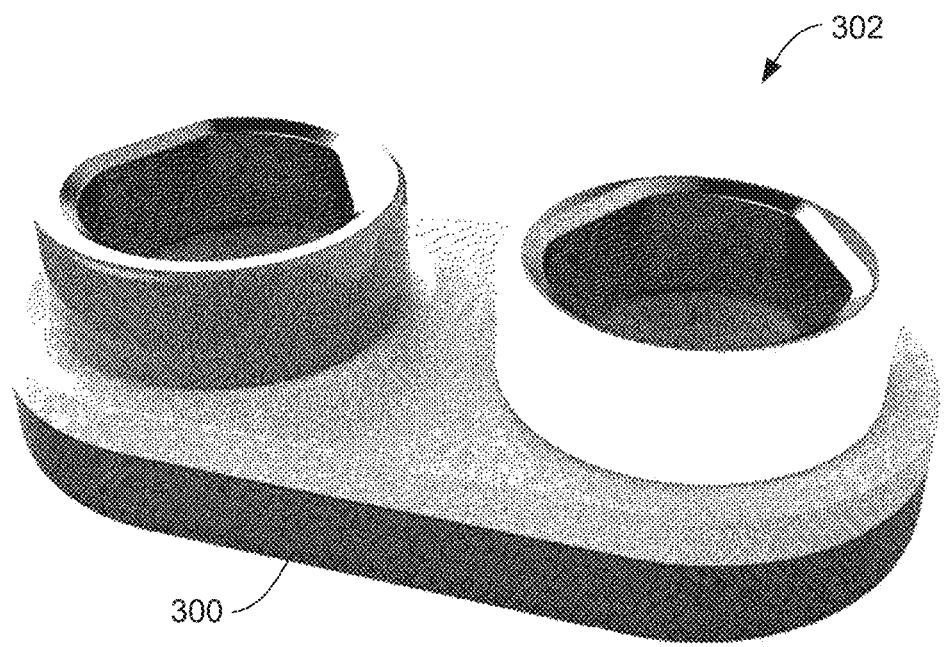
FIGS. 3A-B illustrate examples of external charging systems (e.g. a smart base or smart dock)
Figure 3B:
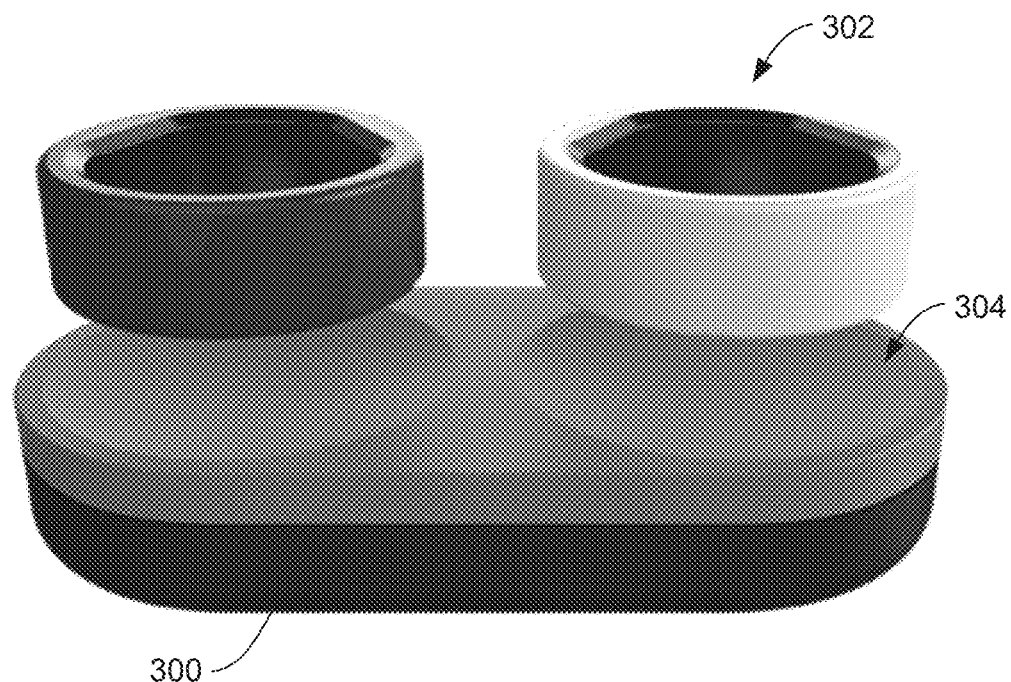

FIGS. 3A-B illustrate examples of external charging systems (e.g. a smart base or smart dock). In various embodiments, smart base 300 they may provide direct electrical power (via electrical conductors), magnetic or rf induction, charging based upon light, or the like to smart wearable devices 302. FIG. 3A illustrates smart rings 302 disposed upon smart base 300, and FIG. 3B illustrates smart rings 302 removed from indentations 304 of smart base 300.

In some of the above embodiments, it is contemplated that NFC interfaces are positioned below both of the indentations 302 to facilitate charging of the smart rings 300 and in some cases to facilitate data transfer.

Figure 4A:
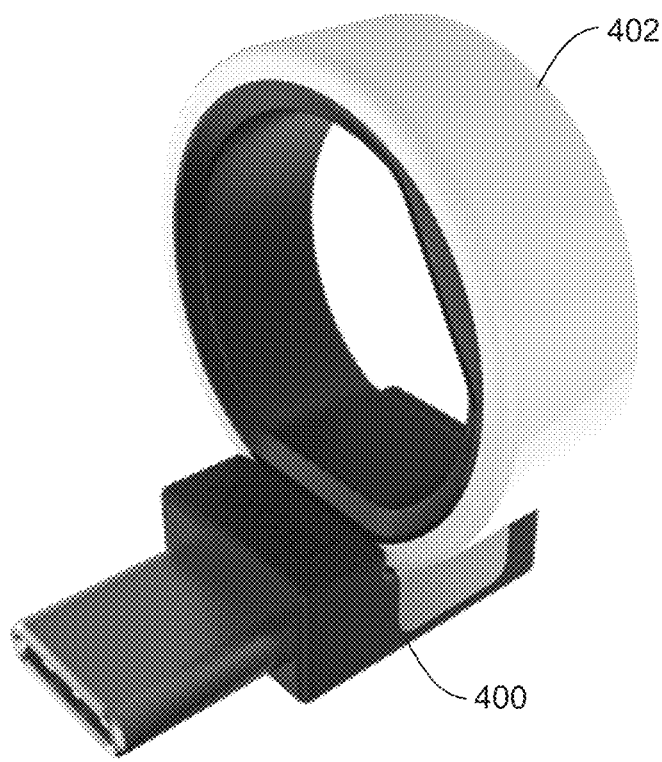
FIGS. 4A-C illustrate additional examples of external charging systems.
Figure 4B:
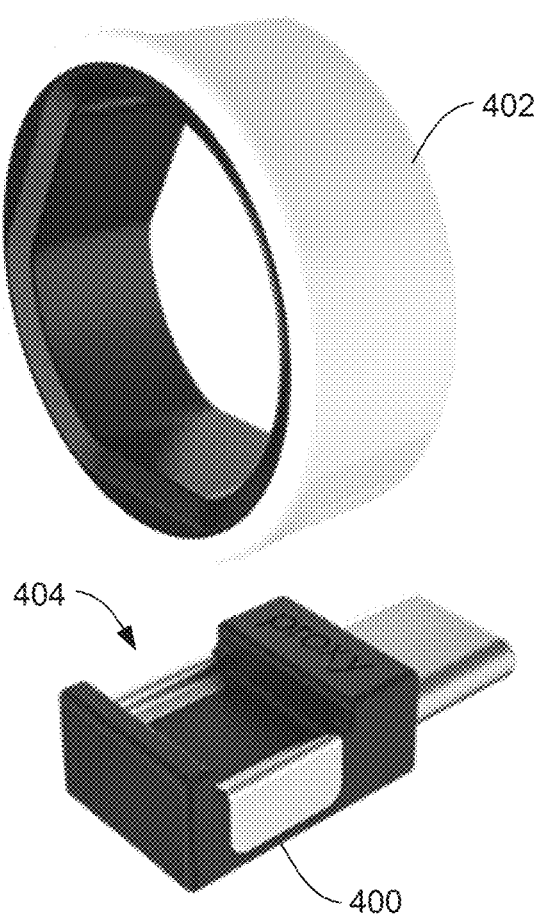
Figure 4C:
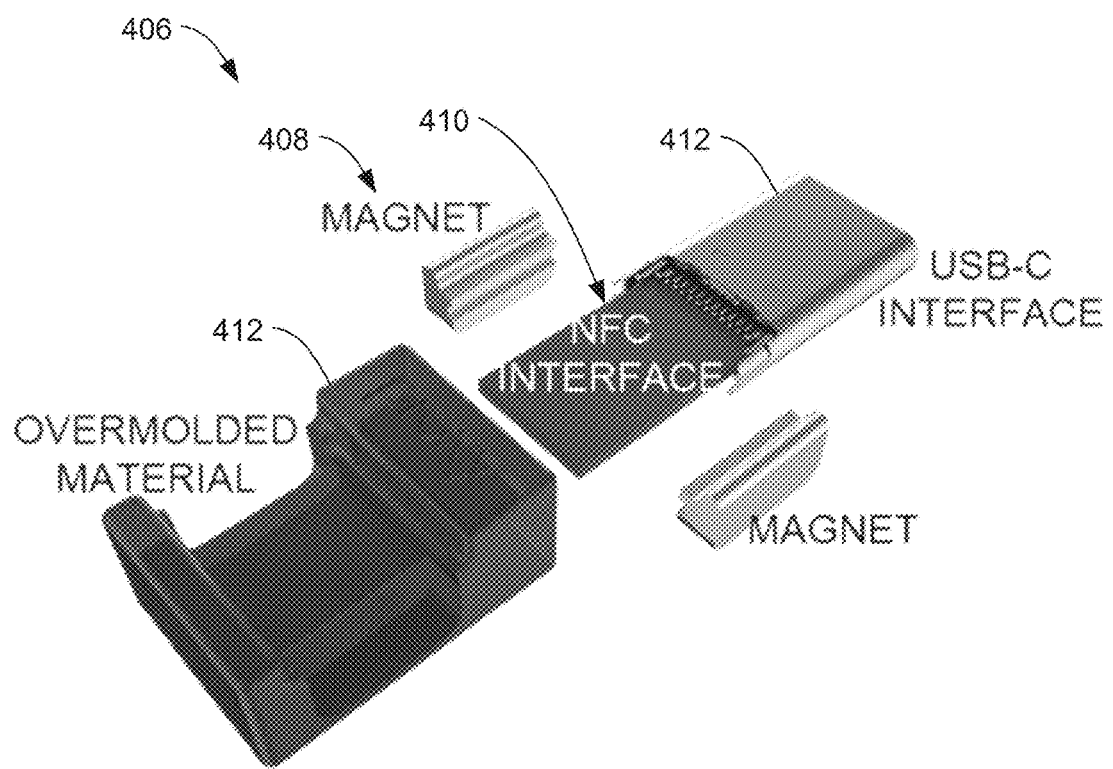

FIGS. 4A-C illustrate additional examples of external charging systems. Similar to the above, smart base 400 may provide electrical power to smart wearable devices 402. In FIG. 4A, a smart ring 402 is illustrated disposed upon smart base 400, and in FIG. 4B, smart ring 402 is removed from smart base 400. As can be seen in these embodiments, the smart wearable devices 402 may be disposed vertically with respect to a charging surface 404.

FIG. 4C illustrates an exploded view 406 of a smart base 400 according to some embodiments. In various embodiments, for the single smart ring charger 400, magnets 408 may be used to secure the smart ring 402 adjacent to the NFC interface/charging portion 410. In this embodiment, the black material 412 may be over molded over the NFC interface 410 and portions of the magnets 408, may be a plastic shell, or the like. It is contemplated that portions of the smart ring will include magnets or metal such that the smart ring 402 will be properly aligned to the NFC interface/charging portion 410 to facilitate data transfer, power transfer, or the like. Also illustrated in FIG. 4C is an example of an external interface 414 for smart base 400. External interface 414 may be a USB connector (e.g. USB-C, Micro-USB), or other standard computer/charging interface.

As discussed above, in some embodiments, the various charging docks may include circuitry such as: a processor, secure memory element, and the like to support the NFC interface and communications. In some cases, the NFC communications may be used to push firmware updates, new functionality, or the like from a connected device (e.g. laptop) to the smart ring; may be used to facilitate quick charging (e.g. receive communications regarding the charge status and regulate the power output); may be used to test and condition the hardware of the smart ring; and the like.

In some specific embodiments, the smart dock may be used to facilitate storage of user data from the smart ring. In one example, the smart dock may be used to back-up usage data, e.g. steps taken, flights of stairs taken, temperature data and the like. In another example, the smart dock may be used to back-up secure data stored upon the smart ring, e.g. in a memory, secure memory element, or the like. Such data may include a credit card numbers, device account numbers (e.g. similar to Apple DAN), personally identifiable information, employee or member badge or credentials, access tokens issued by service providers (e.g. Proxy, Inc.), financial account data (e.g. blockchain wallet data, pointers to ledgers, etc.), Bitcoin or blockchain data, private keys, and the like.

In still other examples, the sensitive data may include the biometric data, such as data sensed data by the smart ring, a biometric model developed using such sensed data, a hash of the sensed data or biometric model, an encrypted version of the sensed data or biometric model, and the like. In various embodiments, this biometric data may be used by the smart ring to determine if the present wearer of the smart ring is authorized to access the data. Such data may also be stored on the secure memory element of the smart ring and transferred to a secure memory element of the smart dock.

In the below description, an exemplary smart wearable device is a smart ring, however it should be understood that the smart wearable device may be any other of the smart wearable devices described herein. A process for facilitating the transfer of the above user data may include the following steps:

1. A user puts on a smart ring onto their finger, that has sensitive data stored therein;
2. The smart ring senses biometric data of the user, e.g. captures fingerprint, voice print, capillary map, or the like, as discussed above;
3. The smart ring (e.g. processor) may process the sensed biometric data and then compare it to a biometric data model of an authorized user of the smart ring (stored in a secure memory). In some embodiments, the sensed biometric data, the biometric data model, or the like may be hashed, encrypted, encoded or the like, and stored in that form in the secure memory. The storage and/or transfer of such biometric data is typically preferred, to maintain a high level of privacy;
4. If there is no biometric match, the smart ring may not unlock, and the user will not be able to use functionality of the smart ring (e.g. use NFC to access data, use Bluetooth, recharge the smart ring, or the like, depending upon the restrictions desired);
5. If there is a biometric match, the smart ring may unlock, and the user can use the functionality of the smart ring they have purchased or subscribed to. In one example, by unlocking the smart ring, the smart ring may communicate with external devices to provide the secure data, e.g. private key, bitcoin wallet address, or the like. In another example, the authorized user may purchase or be given a smart ring with basic functionality, and the user may be given the option to add additional functionality, e.g. electrocardiogram data, blood oxygen data, sleep analysis, heart rate variability analysis, or the like. In some cases, this additional functionality may be purchased as a one-time payment or subscribed to;
6. The authorized user may then dock their smart ring upon a smart dock;
7. A communications channel may then be established between the smart ring and the smart dock directly, e.g. via direct electrical connection, or wirelessly, e.g. via NFC, BLE, UWB, light, or the like;
8. After the smart dock determines that the smart ring was unlocked by an authorized user, the smart ring may request the transfer of the data from the smart ring secure memory to the smart dock secure memory;
9. The smart ring then transfers this data to the smart dock, and the smart dock stores the secure data. The data transfer may be encrypted for additional security. Alternatively, the data stored in the smart dock secure memory and the data stored on the smart ring secure memory may be synchronized. In some embodiments, the secure memory element of the smart dock is secure and may not be accessed by a host PC, or the like;
10. The smart dock may also send power to the smart ring in the form of direct electrical power, electromagnetic fields (e.g. via NFC), bright laser of light, or the like; and
11. The smart ring may use the received power to recharge its internal battery.

The process above may be repeated: each time the authorized wearer puts their smart ring upon the smart dock; upon demand; after an elapsed amount of time (e.g. once a week); or the like.

In various embodiments, if the owner loses or misplaces their smart ring, they may initialize another smart ring for their use, for example with the following steps:

1. A user puts on a new smart ring onto their finger;
2. The new smart ring senses biometric data of the user, e.g. captures fingerprint, voice print, or the like, as discussed above. In some embodiments, only a few biometric data points may be captured, and in other embodiments, the user may perform this action in many different ways, so that a new biometric data model for the user's finger may be determined;
3. The new smart ring (e.g. processor) may then process the sensed biometric data (or new biometric data model). Similar to above, this data may be hashed, encrypted, encoded or the like to maintain a high level of privacy. In some embodiments, the new biometric data model may be maintained in the secure memory element;
4. The authorized user may then dock their new smart ring upon the smart dock;
5. A communications channel may then be established between the new smart ring and the smart dock directly, e.g. via direct electrical connection, or wirelessly, e.g. via NFC, BLE, UWB, light, or the like;
6. Next, the new smart ring then transfers this data to the smart dock. The data transfer may be encrypted for additional security.
7. The smart dock may then decrypt the data, if encrypted, and compare it to the data already stored in the secure memory element of the smart dock. For example, it may take the new biometric data model and compare it to the biometric data model (the known good one stored in the smart dock) to determine if they substantially match. In other embodiments, additional methods for matching are contemplated, for example, the hashed new biometric data model may be compared to a hashed version of the biometric data model (stored in the smart dock), and the like;
8. If the smart dock determines that there is a match, the smart dock may send the data stored in the secure memory element to the new smart ring, using the same communications channel described above, or different one;
9. If there is no match, the user may retry the process described above, as sensitive data stored in the smart dock is inhibited from being transferred to the new smart ring;
10. The new smart ring then receives the data and reprovisions the ring using that data, i.e. the new smart ring will be provisioned in substantially the same way as the original (misplaced, lost, etc.) smart ring;
11. The smart dock may also send power to the new mart ring in the form of direct electrical power, electromagnetic fields (e.g. via NFC), bright laser of light, or the like; and
12. The smart ring may use the received power to recharge its internal battery.

Figure 5:
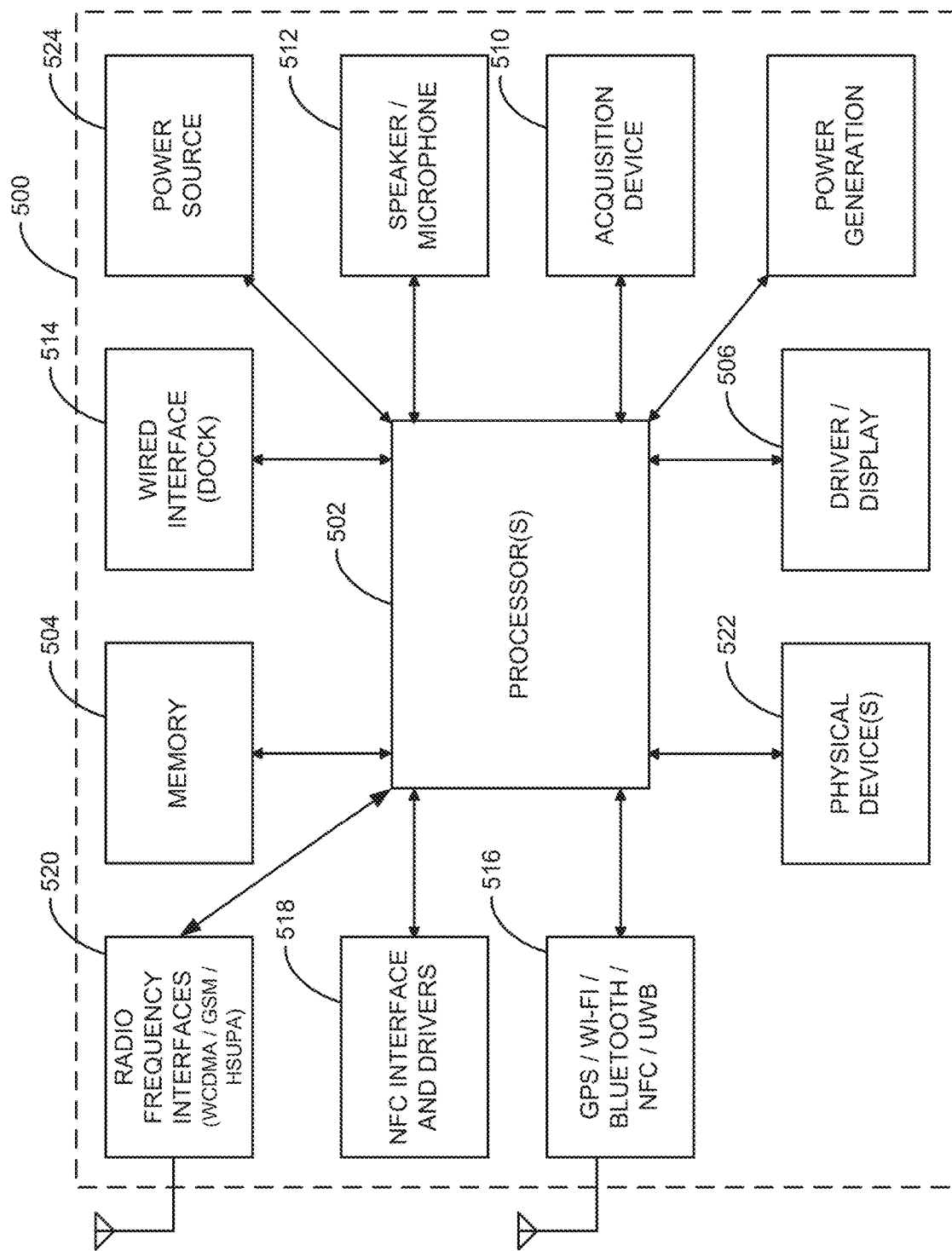
FIG. 5 illustrates a functional block diagram of various embodiments of the present invention.

FIG. 5 illustrates a functional block diagram of various embodiments of the present invention. More specifically, it is contemplated that from user smart devices (e.g. smart wearable devices, smart phones, tablets), to laptops, to cloud-based servers, etc. may be implemented with a subset or superset of the below illustrated components.

In FIG. 5, a computing device 500 may include some, but not necessarily all of the following components: an applications processor 502, memory 504, a display 506, an image acquisition device 510, audio input/output devices 512, and the like. Additional communications from and to computing device 500 can be provided by via a wired interface 514 (e.g. dock, plug, controller interface to peripheral devices); a GPS/Wi-Fi/Bluetooth interface/UWB 516; an NFC interface (e.g. antenna or coil) and driver 518; RF interfaces and drivers 520, and the like. Also included in some embodiments are physical sensors 522 (e.g. (MEMS-based) accelerometers, gyros, magnetometers, pressure sensors, temperature sensors, bioimaging sensors etc.).

In various embodiments, computing device 500 may be a computing device (e.g. Apple iPad, Microsoft Surface, Samsung Galaxy Note, an Android Tablet); a smart phone (e.g. Apple iPhone, Google Pixel, Samsung Galaxy S); a portable computer (e.g. netbook, laptop, convertible), a media player (e.g. Apple iPod); a reading device (e.g. Amazon Kindle); a fitness tracker (e.g. Fitbit, Apple Watch, Garmin or the like); a headset or glasses (e.g. Oculus Rift, HTC Vive, Sony Playstation VR, Magic Leap, Microsoft HoloLens); a wearable device (e.g. Motiv smart ring, smart headphones); an implanted device (e.g. smart medical device), a POS device, a server or the like. Typically, computing device 500 may include one or more processors 502. Such processors 502 may also be termed application processors, and may include a processor core, a video/graphics core, and other cores. Processors 502 may include processor from Apple (A15, M1, etc.), NVidia (Tegra, etc.), Intel (Core), Qualcomm (Snapdragon), Samsung (Exynos), ARM (Cortex), MIPS technology, a microcontroller, and the like. In some embodiments, processing accelerators may also be included, e.g. an AI accelerator, Google (Tensor processing unit), a GPU, or the like. It is contemplated that other existing and/or later-developed processors/microcontrollers may be used in various embodiments of the present invention.

In various embodiments, memory 504 may include different types of memory (including memory controllers), such as flash memory (e.g. NOR, NAND), SRAM, DDR SDRAM, or the like. Memory 504 may be fixed within computing device 500 and may include removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), security applications, application data, operating system data, databases or the like. Additionally, in some embodiments, a secure device including secure memory and/or a secure processor are provided. It is contemplated that other existing and/or later-developed memory and memory technology may be used in various embodiments of the present invention.

In various embodiments, display 506 may be based upon a variety of later-developed or current display technology, including LED or OLED status lights; touch screen technology (e.g. resistive displays, capacitive displays, optical sensor displays, electromagnetic resonance, or the like); and the like. Additionally, display 506 may include single touch or multiple-touch sensing capability. Any later-developed or conventional output display technology may be used for embodiments of the output display, such as LED IPS, OLED, Plasma, electronic ink (e.g. electrophoretic, electrowetting, interferometric modulating), or the like. In various embodiments, the resolution of such displays and the resolution of such touch sensors may be set based upon engineering or non-engineering factors (e.g. sales, marketing). In some embodiments, display 506 may integrated into computing device 500 or may be separate. In some embodiments, display 506 may be in virtually any size or resolution, such as a 4K resolution display, a microdisplay, one or more individual status or communication lights, e.g. LEDs, or the like.

In some embodiments of the present invention, acquisition device 510 may include one or more sensors, drivers, lenses and the like. The sensors may be visible light, infrared, and/or UV sensitive sensors, ultrasonic sensors, or the like, that are based upon any later-developed or convention sensor technology, such as CMOS, CCD, or the like. In some embodiments of the present invention, image recognition algorithms, image processing algorithms or other software programs for operation upon processor 502, to process the acquired data. For example, such software may pair with enabled hardware to provide functionality such as: facial recognition (e.g. Face ID, head tracking, camera parameter control, or the like); fingerprint capture/analysis; blood vessel capture/analysis; iris scanning capture/analysis; otoacoustic emission (OAE) profiling and matching; and the like. In additional embodiments of the present invention, acquisition device 510 may provide user input data in the form of a selfie, biometric data, or the like.

In various embodiments, audio input/output 512 may include conventional microphone(s)/speakers. In various embodiments, voice processing and/or recognition software may be provided to applications processor 502 to enable the user to operate computing device 500 by stating voice commands. In various embodiments of the present invention, audio input 512 may provide user input data in the form of a spoken word or phrase, or the like, as described above. In some embodiments, audio input/output 512 may be integrated into computing device 500 or may be separate.

In various embodiments, wired interface 514 may be used to provide data or instruction transfers between computing device 500 and an external source, such as a computer, a remote server, a POS server, a local security server, a storage network, another computing device 500, a client device, a peripheral device to control (e.g. a security door latch, a turnstile latch, a gate, a status light, etc.), or the like. Embodiments may include any later-developed or conventional physical interface/protocol, such as: USB, micro USB, mini USB, USB-C, Firewire, Apple Lightning connector, Ethernet, POTS, custom dock, or the like. In some embodiments, wired interface 514 may also provide electrical power, or the like to power source 524, or the like. In other embodiments interface 514 may utilize close physical contact of device 500 to a dock for transfer of data, magnetic power, heat energy, light energy, laser energy or the like. Additionally, software that enables communications over such networks is typically provided.

In various embodiments, a wireless interface 516 may also be provided to provide wireless data transfers between computing device 500 and external sources, such as computers, storage networks, headphones, microphones, cameras, or the like. As illustrated in FIG. 5, wireless protocols may include Wi-Fi (e.g. IEEE 802.11 a/b/g/n, WiMAX), Bluetooth, Bluetooth Low Energy (BLE) IR, near field communication (NFC), ZigBee, Ultra-Wide Band (UWB), Wi-Fi, mesh communications, and the like.

GPS receiving capability may also be included in various embodiments of the present invention. As illustrated in FIG. 5, GPS functionality is included as part of wireless interface 516 merely for sake of convenience, although in implementation, such functionality may be performed by circuitry that is distinct from the Wi-Fi circuitry, the Bluetooth circuitry, and the like. In various embodiments of the present invention, GPS receiving hardware may provide user input data in the form of current GPS coordinates, or the like, as described above.

Additional wireless communications may be provided via RF interfaces in various embodiments. In various embodiments, RF interfaces 520 may support any future-developed or conventional radio frequency communications protocol, such as CDMA-based protocols (e.g. WCDMA), GSM-based protocols, HSUPA-based protocols, G4, G5, or the like. In some embodiments, various functionality is provided upon a single IC package, for example the Marvel PXA330 processor, and the like. As described above, data transmissions between a smart device and the services may occur via Wi-Fi, a mesh network, 4G, 5G, or the like.

In various embodiments, any number of future developed, current operating systems, or custom operating systems may be supported, such as iPhone OS (e.g. iOS), Google Android, Linux, Windows, MacOS, or the like. In various embodiments of the present invention, the operating system may be a multi-threaded multi-tasking operating system. Accordingly, inputs and/or outputs from and to display 506 and inputs/or outputs to physical sensors 522 may be processed in parallel processing threads. In other embodiments, such events or outputs may be processed serially, or the like. Inputs and outputs from other functional blocks may also be processed in parallel or serially, in other embodiments of the present invention, such as acquisition device 510 and physical sensors 522.

In some embodiments of the present invention, physical sensors 522 (e.g. MEMS-based) accelerometers, gyros, magnetometers, pressure sensors, temperature sensors, imaging sensors (e.g. blood oxygen, heartbeat, blood vessel, iris data, etc.), thermometer, otoacoustic emission (OAE) testing hardware, and the like may be provided. The data from such sensors may be used to capture data associated with device 500, and a user of device 500. Such data may include physical motion data, pressure data, orientation data, or the like. Data captured by sensors 522 may be processed by software running upon processor 502 to determine characteristics of the user, e.g. gait, gesture performance data, or the like and used for user authentication purposes. In some embodiments, sensors 522 may also include physical output data, e.g. vibrations, pressures, and the like.

In some embodiments, a power supply 524 may be implemented with a battery (e.g. LiPo), ultracapacitor, or the like, that provides operating electrical power to device 500. In various embodiments, any number of power generation techniques may be utilized to supplement or even replace power supply 524, such as solar power, liquid metal power generation, thermoelectric engines, rf harvesting (e.g. NFC) or the like.

FIG. 5 is representative of components possible for a smart reader, a smart device, an authentication service server, a transaction service server, smart dock, smart ring and the like for embodying different embodiments. It will be readily apparent to one of ordinary skill in the art that many other hardware and software configurations are suitable for use with the present invention. Embodiments of the present invention may include at least some but need not include all of the functional blocks illustrated in FIG. 5. For example, a smart phone (e.g. access control device) configured to perform may of the functions described above includes most if not all of the illustrated functionality. As another example, a wearable device, e.g. a smart ring (electronic devices enclosed in a ring-shaped shell, enclosure, or form factor) or smart dock, may include some of the functional blocks in FIG. 5, but it need not include a high-resolution display 530 or a touch screen, a speaker/microphone 560, wired interfaces 570, or the like. In still other examples, a cloud-based server or a virtual machine (VM) may not include image acquisition device 512, MEMs devices 522, GPS capability 516, and the like, further components described above may be distributed among multiple computers, virtual machines, or the like.

Further embodiments can be envisioned to one of ordinary skill in the art after reading this disclosure. In some embodiments, a fingerprint sensor, or other biometric input may be provided within the smart dock itself. In such cases, sensitive data stored on a smart dock may be output to a new smart ring or a smart ring provisioned to a third party, when the biometric data of the user is authenticated on the smart dock. In additional cases, a new smart ring may be provisioned if the biometric data acquired by the smart dock and the new smart ring both match the biometric data stored on the smart dock.

In other embodiments, combinations or sub-combinations of the above disclosed invention can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present invention.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

The specification and drawings are, accordingly, to be regarded in an illustrative rather than a restrictive sense. It will, however, be evident that various modifications and changes may be made thereunto without departing from the broader spirit and scope of the invention as set forth in the claims. More specifically, the claims provide additional disclosure regarding contemplated additional methods of operation, methods for fabrication, additional components and functionalities, and apparatus according to various embodiments of the present invention.

We claim:

1. A smart ring, comprising:
   a biometric sensing device configured to capture biometric data associated with a wearer of the smart ring;
   a processor coupled to the biometric sensing device, wherein the processor is configured to:
      determine that the wearer is an authorized user of the smart ring based at least in part on the biometric data; and
      determine secure user data for the wearer based at least in part on determining that the wearer is the authorized user of the smart ring; and
   a short-range transceiver configured to:

transmit, to a smart dock configured to provide power to the smart ring, the secure user data based at least in part on the processor determining that the wearer is the authorized user of the smart ring, in response to the smart ring being docked onto the smart dock, and based at least in part on the processor determining that the smart dock is associated with the smart ring;

transmit, to the smart dock, the biometric data while transmitting the secure user data, in response to the smart ring being docked onto the smart dock, and based at least in part on the processor determining that the smart dock is associated with the smart ring; and receive, from the smart dock based at least in part on transmitting the biometric data to the smart dock, the secure user data previously transmitted to the smart dock in response to the smart ring being docked onto the smart dock.

2. The smart ring of claim 1, wherein the biometric sensing device comprises an ultrasonic sensor, an imaging sensor, a fingerprint sensor, a blood vessel sensor, a heart-beat sensor, an iris sensor, a movement sensor, or an audio sensor.

3. The smart ring of claim 1, wherein the secure user data comprises financial data, data associated with one or more financial accounts, one or more cryptographic keys, one or more blockchain addresses, one or more settings, one or more preferences, or one or more passwords.

4. The smart ring of claim 1, further comprising:
a power input portion configured to receive power signals from the smart dock and configured to recharge a power source of the smart ring in response to the power signals, wherein the power signals comprise magnetic fields, radio frequency (RF) fields, light signals, or laser signals.

5. The smart ring of claim 4, wherein the power input portion is configured to couple with a power output portion of the smart dock directly via electrical connections, indirectly via magnetic induction, indirectly via radio frequency (RF) fields, or indirectly via optical signals.

6. The smart ring of claim 1, further comprising:
a secure memory element configured to store a token from a remote authentication service; and
a second short-range transceiver coupled to the secure memory element, wherein the second short-range transceiver is configured output the token to a reader device, under direction of the processor.

7. The smart ring of claim 1, wherein receiving the secure user data is based at least in part on a comparison of the biometric data with biometric data stored at the smart dock.

8. A method comprises:
capturing, with a first biometric sensing portion of a smart ring, biometric data associated with a wearer of the smart ring;
determining, with a processor of the smart ring, that the wearer is an authorized user of the smart ring based at least in part on the biometric data;
determining, with the processor, secure user data for the wearer based at least in part on determining that the wearer is the authorized user of the smart ring;
transmitting, with a short-range transceiver of the smart ring to a smart dock configured to provide power to the smart ring, the secure user data based at least in part on determining that the wearer is the authorized user of the smart ring, in response to the smart ring being docked onto the smart dock, and based at least in part on determining that the smart dock is associated with the smart ring;
transmitting, with the short-range transceiver of the smart ring to the smart dock, the biometric data while transmitting the secure user data, in response to the smart ring being docked onto the smart dock, and based at least in part on determining that the smart dock is associated with the smart ring; and
receiving, with the short-range transceiver of the smart ring from the smart dock based at least in part on transmitting the biometric data to the smart dock, the secure user data previously transmitted to the smart dock in response to the smart ring being docked onto the smart dock.

9. The method of claim 8 wherein the biometric data comprises ultrasonic data, imaging data, fingerprint data, blood vessel data, heart-beat data, iris data, movement data, or audio data.

10. The method of claim 8 wherein the secure user data comprises financial data, data associated with one or more financial accounts, one or more cryptographic keys, one or more blockchain addresses, one or more settings, one or more preferences, or one or more passwords.

11. The method of claim 8, further comprising:
receiving, from the smart dock, power signals at a first power input portion of the smart ring; and
recharging, with the first power input portion, a first power source of the smart ring in response to receiving the power signals.

12. The method of claim 11, wherein the power signals are received directly via electrical connections, indirectly via magnetic induction, indirectly via radio frequency (RF) fields, or indirectly via optical signals.

13. The method of claim 8, further comprising:
storing, by the smart ring, a token from a remote authentication service;
receiving, with a second short-range transceiver of the smart ring, a beacon identifier from a beacon device;
determining, with the processor, whether the token should be output, in response to the beacon identifier; and
transmitting, with the second short-range transceiver, the token to the beacon device in response to determining that the token should be output.

14. The method of claim 8, wherein receiving the secure user data is based at least in part on a comparison of the biometric data with biometric data stored at the smart dock.

* * * * *